June 14, 1938. C. WASEIGE 2,120,821
PROPELLING DEVICE FOR AEROPLANES
Filed March 18, 1936
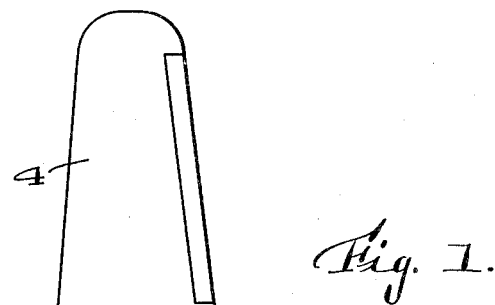
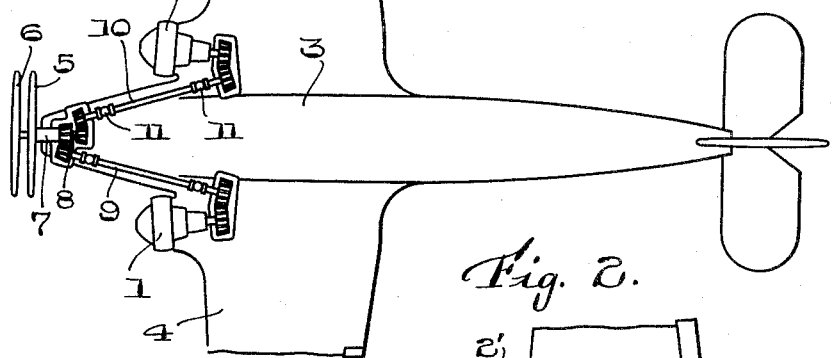
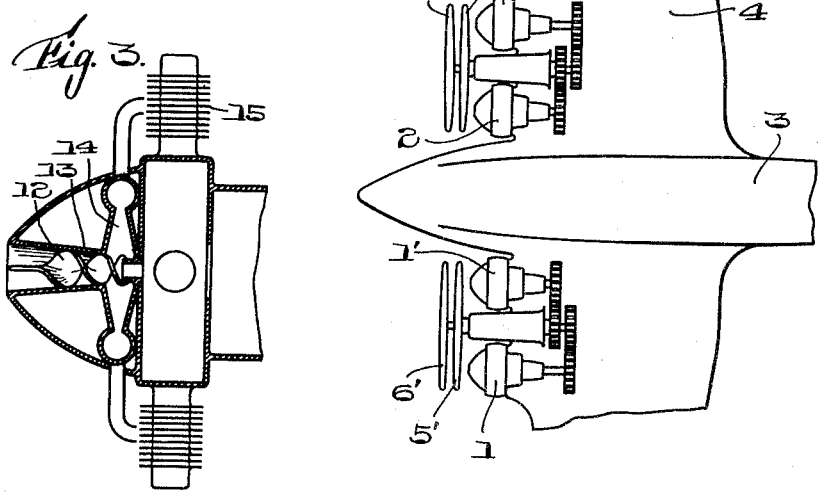
*INVENTOR.*
CHARLES WASEIGE
BY
*ATTORNEYS.*

Patented June 14, 1938

2,120,821

UNITED STATES PATENT OFFICE 2,120,821

PROPELLING DEVICE FOR AEROPLANES

Charles Waseige, Rueil-Malmaison, France

Application March 18, 1936, Serial No. 69,497
In Japan August 1, 1935

1 Claim. (Cl. 244—60)

The present invention relates to a propelling device for aeroplanes using a plurality of motors, which consists in disposing motors symmetrically at either side of the fuselage, arranging two propellers concentrically on the same centre line parallel to the longitudinal axis of the fuselage, connecting each propeller to each motor by means of a transmission gear and rotating the said propellers in the opposite direction to each other. The object thereof is to obtain such a propelling device as enables the aeroplane to maintain the stability by preventing the deflection of the propelling shaft from the fuselage, even if one of the motors has gone out of order and also enables the motors to be cooled without difficulty, because the bosses of the propellers are not situated directly in front of them.

Referring to the annexed drawing which shows an example of the manner of performing this invention, Figure 1 is a plan of an aeroplane provided with two motors;

Figure 2, a partial plan of an aeroplane equipped with four motors and

Figure 3, a partial sectional view of a supercharger.

When the high-speed motor is improved to reduce its front area so that the central portion of the screw propeller is placed directly in front of the motor, it makes it difficult to cool the motor. On the other hand, if many motors are used, the propelling shaft will be deflected in one direction, if one of the motors has gone out of order and stopped running, since each motor is provided with one propeller. Now, according to the present invention the above-mentioned defects may be obviated by disposing motors and propellers near the center of an aeroplane.

In case of double motors, each of them 1 and 2 is placed symmetrically in the wings at either side of and near the fuselage 3, and propellers 5 and 6 are arranged concentrically on the centre line parallel to the longitudinal axis of the fuselage. There is no difficulty in cooling the motors such as is caused by the air being checked by the central bosses of the propellers. Even when one of the motors has stopped by some accident or other, the propelling axis will remain at the center of the aeroplane and as the two propellers rotate in the opposite direction to each other, no couple liable to incline the aeroplane will occur.

The shafts 7 and 8 of the screw propellers may be double hollow ones, so that there is no difficulty in equipping the machine with lateral conduits 14 receiving air from the hollow bosses or limbs through a tube 13 and discharging it at the engine cylinders as shown in Fig. 3.

A screw impeller 12 of gradually decreasing pitch may be located in the tube 13 to force air into the conduits 14 so that the arrangement may be used as a supercharger.

Where there are used four or more motors, screws such as 5' and 6' in Fig. 2, are combined concentrically with two such as 1 and 1' or 2 and 2' driving each pair of them as one set in such a manner that one rotates in the opposite direction to the other, and are disposed near the fuselage. As in this arrangement the propelling shaft is situated near the fuselage, the deflection of the thrust is slight even if one of the motors stops. The transmission gears as in Fig. 1 are attached to the structure of an aeroplane independently of one another, and transmission shafts 9 and 10 are connected to a driving shaft projecting from each bearing by means of a suitable universal joint 11.

I claim:

In a power plant for a two engined aircraft, two coaxial tractive propellers disposed at the forward end of the fuselage, two telescopic shafts respectively carrying said propellers, the rear end of the inner shaft projecting from the outer one, gear wheels respectively keyed on the rear ends of said shaft, two casings secured to the said fuselage and respectively forming bearing means for said shafts and enclosing said gear wheels, two intermediate short shafts journaled in said casing symmetrically with reference to the propeller axis and slightly inclined on said axis, said intermediate shafts having projections within and out of the associated casing, gear wheels keyed on said shaft projections within the casings and in mesh respectively with the gear wheels on the propeller shafts, two engines symmetrically carried by the aircraft wings quite near the fuselage and having their crankshaft end projecting towards the rear of the aircraft, two gear wheels secured respectively on said crankshaft ends, two intermediate short shafts symmetrical with respect to the propeller axis and slightly inclined thereon, boxes secured to the engine and respectively forming a bearing for said intermediate shafts, gear wheels respectively secured on said intermediate shafts within the boxes, universal joints at each end of said four intermediate shafts out of the casings, and two inclined shafts connecting the two universal joints situated on the same side.

CHARLES WASEIGE.